Dec. 9, 1930.  J. B. KIRBY  1,784,145
MOTION ARRESTING MEANS FOR MOTOR PROPELLED VEHICLES
Filed June 2, 1922  2 Sheets-Sheet 1
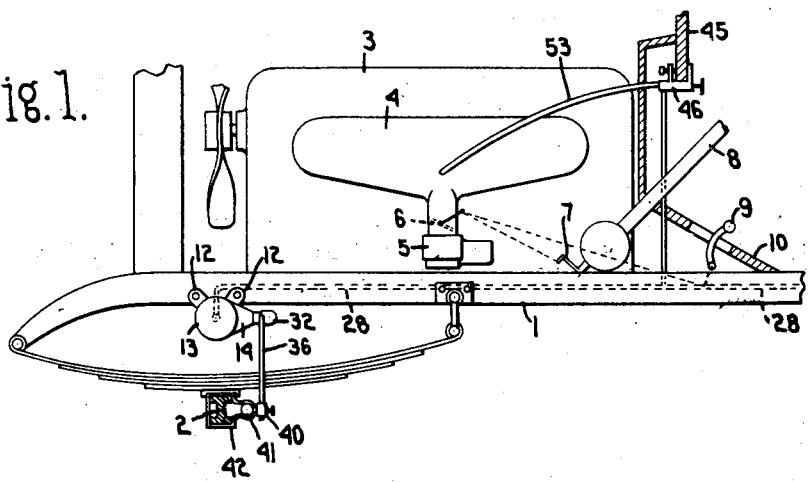
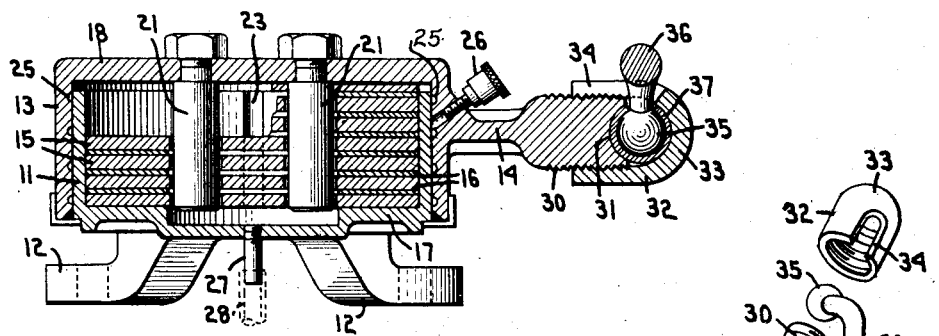
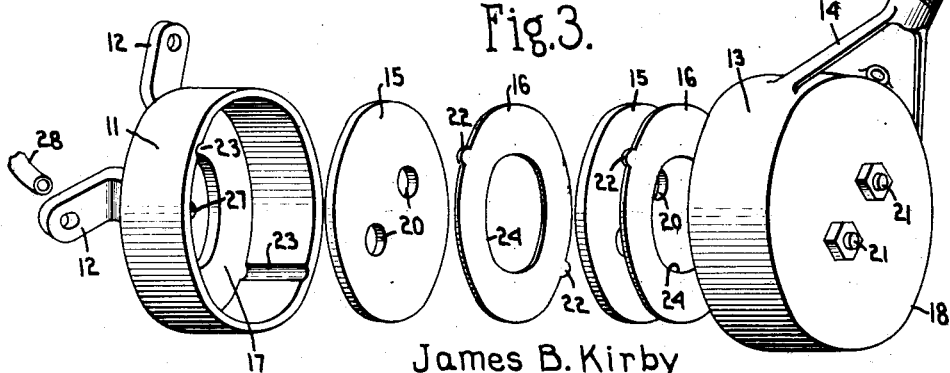
James B. Kirby
INVENTOR.
BY
ATTORNEY.

Dec. 9, 1930.  J. B. KIRBY  1,784,145
MOTION ARRESTING MEANS FOR MOTOR PROPELLED VEHICLES
Filed June 2, 1922  2 Sheets-Sheet 2
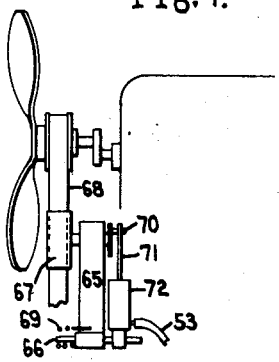
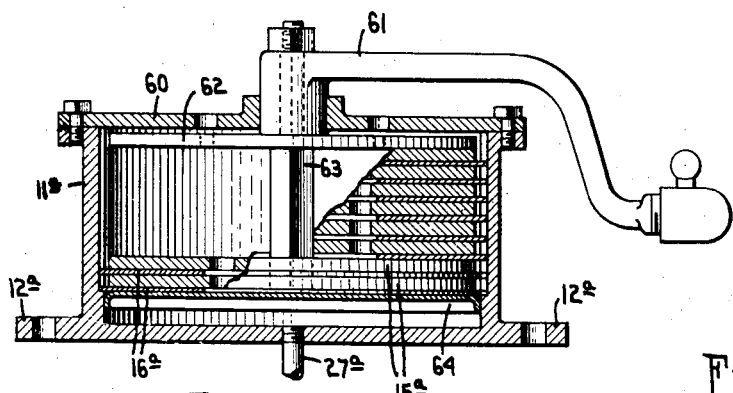
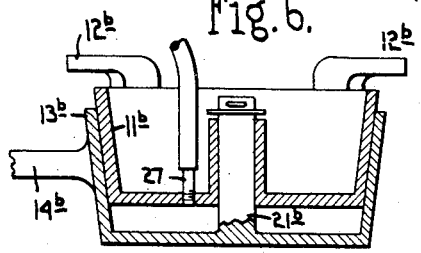
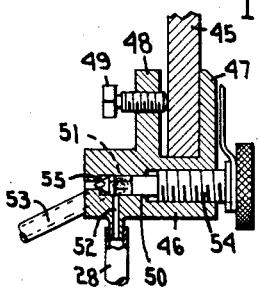
James B. Kirby
*INVENTOR.*
BY
*ATTORNEY.*

Patented Dec. 9, 1930

1,784,145

UNITED STATES PATENT OFFICE

JAMES B. KIRBY, OF WEST RICHFIELD, OHIO

MOTION-ARRESTING MEANS FOR MOTOR-PROPELLED VEHICLES

Application filed June 2, 1922. Serial No. 565,317.

This invention relates to means for arresting relative motion between two relatively movable parts of a motor-propelled vehicle. One use of the invention concerns that class of devices, popularly known as shock absorbers, employed for restraining the excessively violent movements of automobile springs, thereby rendering the movements of the vehicle body more comfortable and decreasing the danger of breaking the springs. From the shock-absorbing point of view the objects of the invention are the provision of a new, compact, simple, and long wearing device of this character which can readily be applied to any standard make of automobile and wherein the spring retarding effect can be varied according to different driving conditions; the provision of a shock absorber system so arranged that all the shock absorbing devices carried by the vehicle can be adjusted simultaneously and equally; the provision of further expedients whereby the adjustment of the shock absorbers may under certain conditions be rendered automatic; the provision of a device of this character which shall be easy upon the vehicle tires and shall operate equally under all vehicle loads. Another aspect of the invention concerns the use of the vacuum-conditions existing in the manifold of an internal combustion engine for the purpose of arresting relative movement between two parts of a vehicle; while further objects and advantages of the invention will become apparent as the description proceeds.

It is well known that the importance of shock absorbers varies with the weight of the car body and its load, the stiffness of the springs, the speed of driving, and the condition of the road-bed. Accordingly, to get the best results, the device must be adjusted for each loading, each road surface, and each change in vehicle speed. It is always best to afford the springs the highest possible freedom of movement in order that the wheels may follow faithfully the inequalities of road surface so as to maintain a uniform tractive effect and minimize tire wear. The purpose of springs on a vehicle is to absorb jolts before they reach the car body, which they do until the unevenness becomes so great that the spring reaction is expended upon the body rather than upon the wheels at which time it becomes desirable to restrain the rebound of the spring. Merely to retard this rebound is not always sufficient. Nearly every manufacturer employs springs considerably stiffer than are required to carry the load solely to decrease the amplitude of their movement within limits which shall postpone crystallization for the normal life of the car. If a very flexible spring be used, it will afford easy riding but will become depressed unduly at every inequality unless its compression be restrained by some auxiliary device. This indicates the desirability of opposing the compression as well as the recoil. Furthermore, if the retarding action be confined wholly to restraining the rebound it must be made so excessive as to permit the spring from ever rising to normal. The result is that the spring, by being kept always depressed, has the same effect as a stiffer spring and its easy riding qualities are lost. My device overcomes this.

I have found it impossible to find any one degree of retardation which is satisfactory under all road conditions. The springs require much less restraint upon the average pavement than upon the average dirt road and it is desirable to provide means for adjusting the degree of this restraint from the driver's seat. It is also desirable that this adjustment be effected quickly and to some degree automatically as when a car which is being driven rapidly over a smooth pavement comes suddenly upon a rough road thereby instantaneously changing the desirability of a minimum spring-retardation to that of a maximum retardation. According to one form of my invention, this change is effected automatically and instantaneously for which purpose I utilize the suction effect existing inside the intake manifold of the engine. It is well known that when an automobile engine is operating under load and at high speed, a comparatively small degree of vacuum exists within the manifold, the throttle being widely opened and the mixture passing therethrough with high velocity. Immediately upon approaching a bad place in the road the first and instinctive act of every driver is to close the throttle, thereby instantly creating a high vacuum inside the manifold. I have discovered that it is feasible to utilize this high vacuum to increase the retarding effect of the shock absorbers thereby instantly adjusting them to their increased work at this instant, while permitting their instantaneous and automatic release the next time the throttle is opened. I also preferably provide means whereby the degree of this regulation can be either increased or decreased but without destroying its automatic character. This vacuum manifold can also be used for other braking purposes.

In the drawings accompanying and forming a part of this application, I have shown certain illustrative embodiments of my invention, although without intent to limit myself thereto. Fig. 1 illustrates a part of an automobile equipped with my improved shock absorber; Fig. 2 is a central sectional view of one form of my device, certain of the plates being omitted; Fig. 3 is a separated perspective of the device shown in Fig. 2; Fig. 4 is an enlarged sectional view of one form of regulating valve; Fig. 5 is a sectional view of a modification; Fig. 6 illustrates another modification; and Fig. 7 illustrates a modified construction and operation of pressure pump.

In its preferred form my improved shock absorber consists essentially of a friction clutch having one part attached to the body and the other part to the axle of the automobile, in combination with a pumping device to enable the clutch members to be operated by fluid pressure; this pumping device may be provided especially for this purpose but I prefer to utilize the engine which propels the vehicle which is essentially a pumping device and not only avoids the necessity of providing a separate mechanism but normally exhibits a variation of pressure conditions conforming approximately to that required to the best control of these friction clutches.

In these drawings 1 represents the frame and 2 the axle of an automobile, 3 the engine, 4 the intake manifold, 5 the carburetor and 6 the throttle, which in most cars is controlled by an arm 7 carried by the steering post 8 and also by a pedal 9 mounted on the floor board 10.

11 represents the fixed member of my shock absorber which is fastened to the frame by ears 12. In one form of my invention this member consists of a hollow cylindrical body fitting snugly but normally inside the body 13 of a slightly larger member from which projects the radial arm 14. Inside the chamber thus produced are located alternate friction disks 15 and plates 16, made of any suitable material such as fiber and steel, respectively, the end members abutting against the end webs 17 and 18 of the fixed member 11 and movable member 13, respectively. These disks and plates are secured to the respective members so as to rotate therewith, this securing being effected in any suitable manner as by forming the disks with apertures 20 receiving posts 21 carried by the web 18, and the plates with ears 22 which fit in grooves 23 formed in the member 11. The centers of these plates are cut away as at 24, so as to avoid the posts, and to create an open center space. One of the abutting surfaces is grooved as at 25 to receive lubricant, and suitable means such as a grease cup 26 is provided therewith. One of the members is also provided with a connection 27 for the reception of the pipe 28.

To attach this device to the axle any suitable device may be employed such as that shown in Figs. 1, 2, and 3. The arm 14 is exteriorly threaded at 30 and is terminated by a hemispherical cavity 31, and screwed on this arm is a hollow cap 32 having a hemispherical end 33 and a longitudinal slot 34. In the socket thus produced is located the ball 35 which projects laterally from the end of the rod 36, a mantle 37 of rawhide being first wrapped about the ball to resist wear and avoid rattle. The lower end of the rod is adjustably clamped in a sleeve 40 integral with a second ball 41 which is held in a socket carried by a suitable axle clamp 42. In this way a single device is applicable to all cars. It makes no difference which side of the device is made the upper one or on which side of the axle it is located, and the installation is the same wherever used, whether at the front axle only or at the rear axle only or at all four corners of the vehicle. The different chambers are connected by the pipe 28 either in series or parallel. Also it makes no difference what load the vehicle bears, although I preferably mount the shock absorber so as to have the arm substantially horizontal at mid load, and the length of the arm should be such that the same never moves above or below an angle of more than about 45°.

If suction be applied to the pipe 28 the two members of the shock absorber are drawn together so as to create friction between the plates and disks, and I preferably effect this by attaching the same to the engine manifold 4, interposing a suitable valve to enable the operator to regulate the action. Such a valve is shown in Fig. 4 as clamped to the instrument board 45 in easy reach of the driver. This valve has a body 46 with a semicircular graduated flange 47 at one end and a bracket 48 opposite thereto carrying the set screw 49. Formed in this body is a bore 50 intersected at different longitudinal points by two branch passageways 51 and 52, the former being connected to the manifold 4 by the pipe 53 and the latter connected to the pipe 28. One end of the bore is enlarged and threaded for the shank 54 of the valve member, the other end is reduced for the tapered end 55 of the same, this member being so designed that when screwed clear in the tapered end 55 closes the air inlet and the passageways 51 and 52 are brought into communication; while if the same be moved outwardly this communication is progressively impeded and a gradually increasing air-leak is produced which releases the clutch-action of the absorbers.

I do not, however, limit myself to the floating disk type of clutch as other types can be used such as the cone clutch shown in Fig. 6, wherein the inner member 11$^b$ is the stationary part supported by the ears 12$^b$, and the outer member 13$^b$ having the arm 14$^b$ engaging a sleeve in the stationary member, a nipple 27 being provided for the pipe 28.

Nor do I restrict myself to the intake manifold as a source of negative fluid pressure but may employ a separate pump, one specimen of which is shown in Fig. 7 wherein 65 represents an arm journaled on a horizontal rod 66 and carrying a drive pulley 67 which runs on the fan-belt 68, being held thereagainst by the spring 69. This pulley turns a crank 70 which operates the plunger 71 of the pump 72 which is connected with either the pipe 28 or the pipe 53. Of course I do not confine myself to this construction or mode of operating the pump, since I prefer to employ the suction in the engine manifold as heretofore described, and the relatively movable parts of the vacuum cell may obviously be connected in braking relation between other relatively movable parts of a vehicle.

I have chosen for illustration a few representative specimens of several widely varying types of device to indicate that I do not restrict myself to any features of design construction, or arrangement, except as specifically recited in my several claims which I desire may be construed, each independently of limitations contained in other claims.

Having thus described my invention what I claim is:

1. In a motion arrester for motor propelled vehicles, a plurality of pairs of relatively movable friction elements adapted to be connected to relatively movable parts of a vehicle, independent vacuum operated means for causing pressure between the elements of each of said pairs and means for controllably connecting all of said means to the manifold of the propelling motor.

2. Vacuum means for arresting relative movement between two coaxial parts of a motor propelled vehicle including a vacuum cell having two relatively rotatable elements, means for securing one of said elements to the axle of a vehicle, means for connecting the other of said elements to a part of the vehicle which is movable relatively to said axle, and means whereby the cell interior may be operatively connected to the intake manifold of the internal combustion engine which propels said vehicle.

3. Motion arresting means for motor propelled vehicles, comprising a part carried by the vehicle axle, a second part rotatable relative to said first part, said parts comprising a vacuum cell and having cooperating friction surfaces, connections between said cell and the manifold of the propelling motor, and means for controlling said connections.

4. In a motor propelled vehicle, a vacuum cell having two relatively rotatable parts connected respectively to two relatively movable parts of the vehicle and means connecting said cell to the manifold of the propelling motor.

5. In a motor propelled vehicle, a vacuum cell having two relatively rotatable parts, connected respectively to the axle and to a part of the vehicle movable relative to said axle and means including a valve and a conduit for connecting said cell to the manifold of the propelling motor.

6. A self propelled vehicle, of the type having an internal combustion engine and rotatable parts, characterzed by vacuum braking means for opposing the relative movement of said parts, means comprising a hollow cell having relatively rotatable elements, one of which is connected to each of said parts and controllable connections to the engine manifold for such vacuum cell.

7. Motion arresting means for motor propelled vehicles, comprising pairs of relatively movable friction elements located at separated points on the vehicle, each of said pairs of elements comprising an element carried by the vehicle axle and a second element rotatable relative to said first element and connected to a part of the vehicle which is movable relative to the axle, a separate vacuum cell operatively connected to each of said pairs of elements, and means for controllably connecting all of said cells to the manifold of the propelling motor.

8. A self-propelled vehicle of the type having an internal combustion engine and a plurality of pairs of relatively rotatable parts, characterized by separate and independent vacuum braking means for opposing the relative movement between the parts of each pair and controllable connections to the engine manifold for all of said vacuum means.

9. In a device of the character described, the combination with a wheeled vehicle propelled by an internal combustion engine, of a shock absorber interposed between the body and axle, said shock absorber having a vacuum chamber and vacuum-responsive means for varying the effective action of said shock absorber, and connections between said chamber and the inlet manifold of said engine.

10. In a device of the character described, the combination with a wheeled vehicle, of a shock absorber interposed between the body and axle and having a fluid chamber, means governed by the pressure conditions in said chamber for varying the effective action of said shock absorber, a pumping device operating continuously during the movement of said vehicle, and valve means under the control of the operator for connecting said chamber either to said pumping device or to the atmosphere.

11. In a device of the character described, the combination with a wheeled vehicle propelled by an internal combustion engine, of a shock absorber interposed between the body and axle, said shock absorber having vacuum responsive means for varying its effective action, connections between said shock-absorber and the inlet manifold of said engine, and a regulating valve interposed in said connections and located within reach of the vehicle operator.

In testimony whereof, I hereunto affix my signature.

JAMES B. KIRBY.